Figure 1:
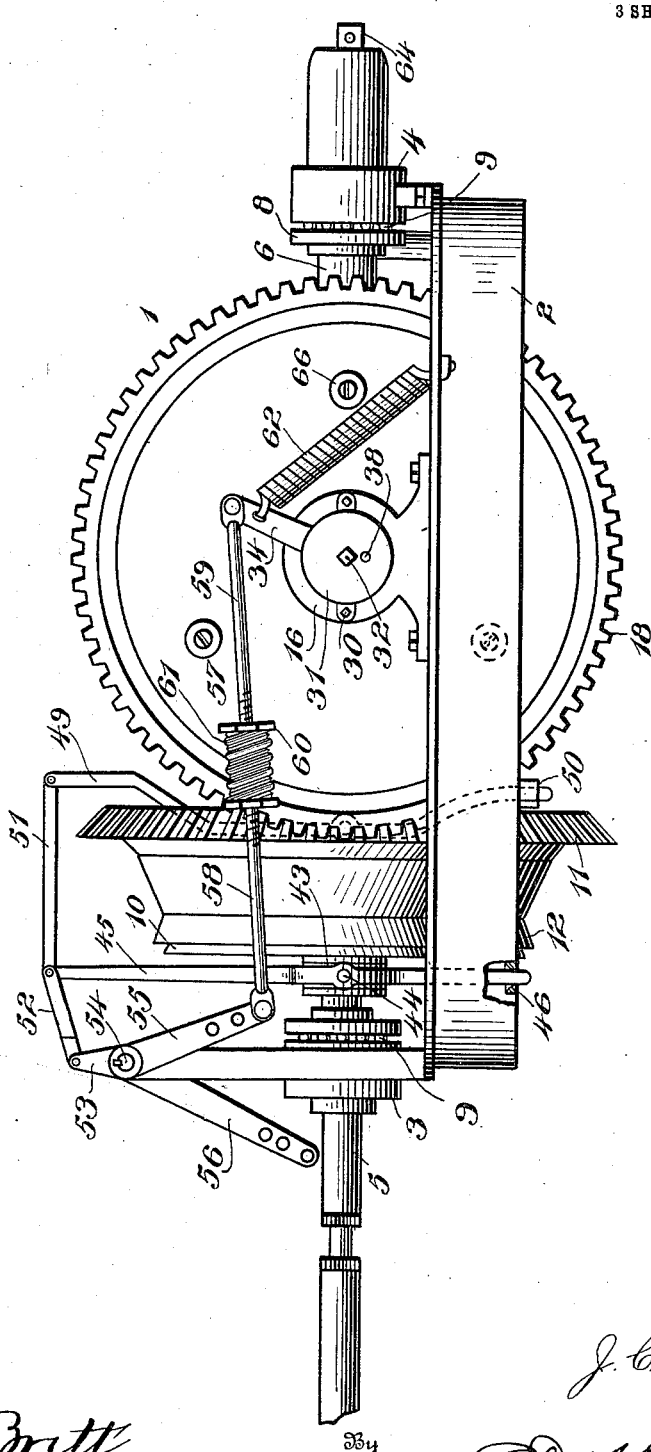

J. C. MACKEY.
FRICTION TRANSMISSION GEAR.
APPLICATION FILED FEB. 4, 1908.

1,011,217.

Patented Dec. 12, 1911.
3 SHEETS—SHEET 1.

Witnesses
J. P. Britt
E. C. Duffy

Inventor
J. C. Mackey
By
C. E. Duffy
Attorneys

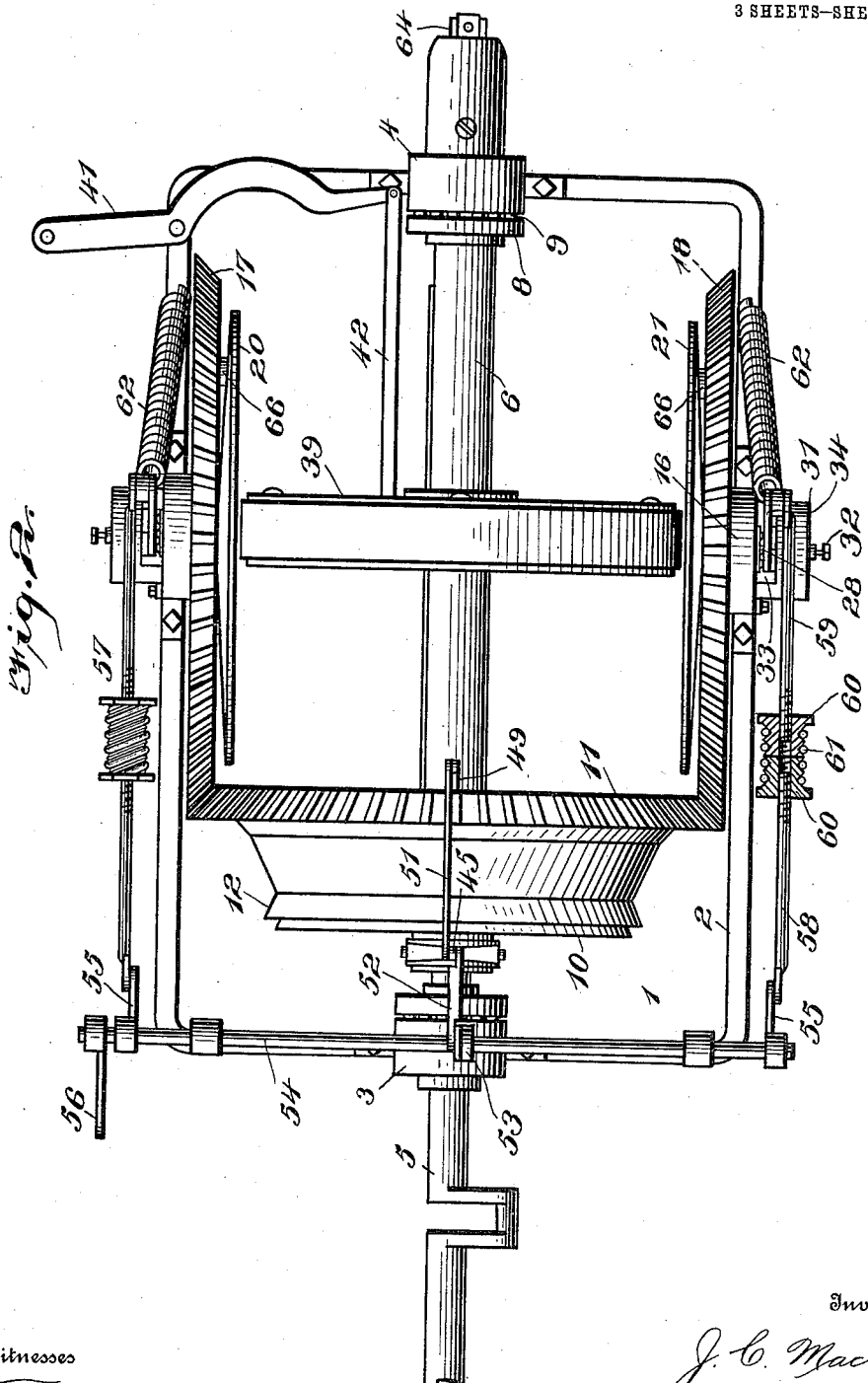

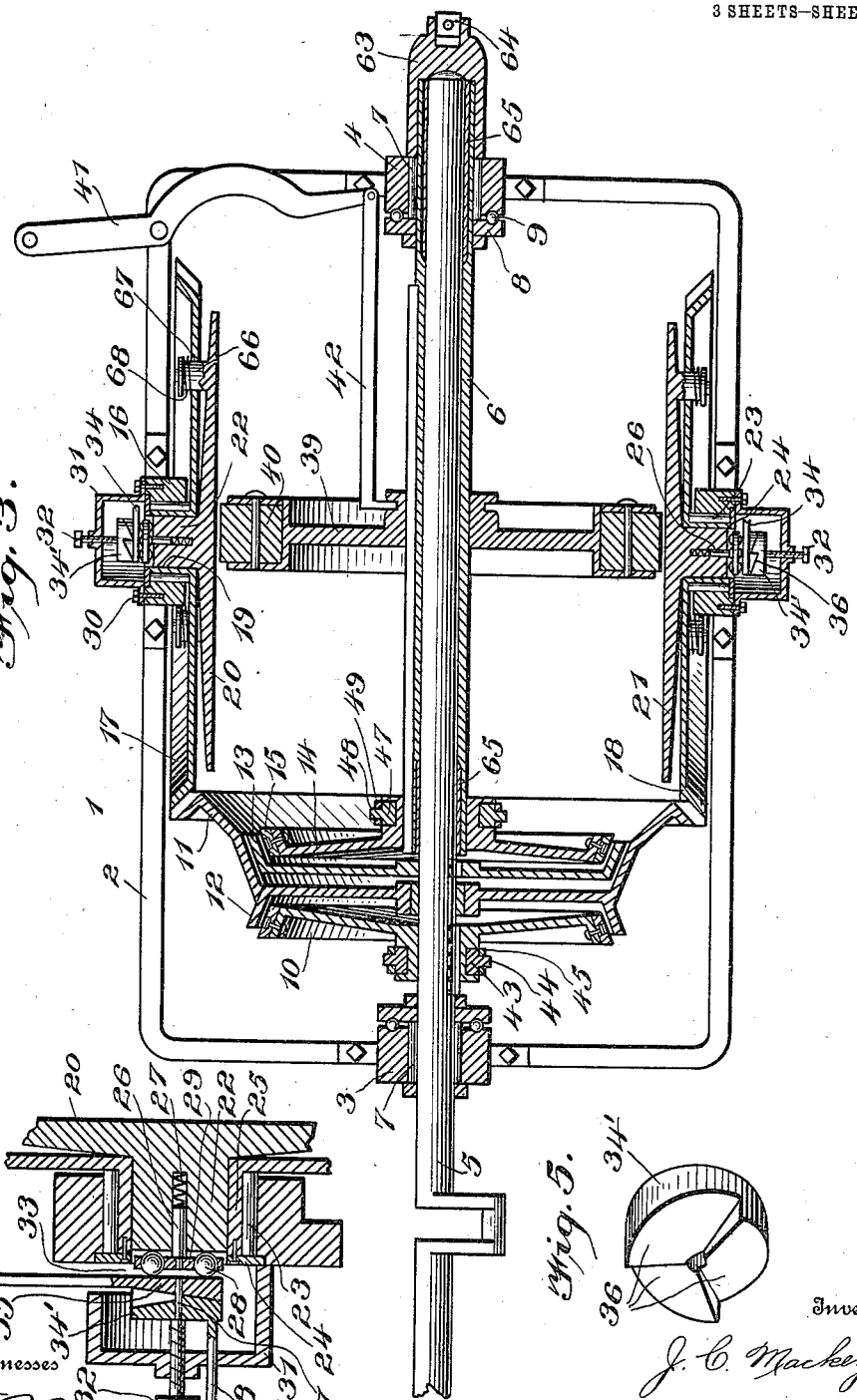

UNITED STATES PATENT OFFICE.

JOHN CLINTON MACKEY, OF DETROIT, MICHIGAN, ASSIGNOR TO ARBRON FRICTION GEAR COMPANY.

FRICTION TRANSMISSION-GEAR.

1,011,217.  Specification of Letters Patent.  Patented Dec. 12, 1911.

Application filed February 4, 1908. Serial No. 414,274.

*To all whom it may concern:*

Be it known that I, JOHN CLINTON MACKEY, a citizen of the United States, residing at Detroit, in the county of Wayne and State of Michigan, have invented certain new and useful Improvements in Friction Transmission-Gears; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to friction transmission gears particularly designed for use on automobiles, and my invention has for its object to provide a device of this class which is particularly simple in construction, cheap and easy to manufacture, strong, durable and efficient.

A further object of my invention is to provide a friction transmission gear which is so constructed and arranged that a direct drive can be accomplished, and by means of certain operating levers the friction drive can be instantly brought into action or the drive can be instantly changed from the friction drive to a direct drive.

With these objects in view my invention consists in the novel construction of the movable friction plate and the associated mechanism for operating the same.

My invention also consists in the construction and arrangement for preventing end play of the driven gears.

My invention also consists in the construction of the divided rods for operating and bringing into action the movable friction plates.

My invention also consists in the novel construction and arrangement of the two clutches which act in the capacity of master clutches.

My invention also consists in the construction of the driving gear and in certain other novel details of construction and in combinations of parts all of which will be first fully described and afterward specifically pointed out in the appended claims.

Referring to the accompanying drawings: Figure 1 is a side elevation of a friction transmission gear constructed in accordance with my invention. Fig. 2 is a top plan view of the same. Fig. 3 is a horizontal section taken through Fig. 1. Fig. 4 is an enlarged detail sectional view showing the mechanism for operating the movable friction plates, and Fig. 5 is a perspective view of one of the disks or members employed for forcing the movable friction plates into operative position.

Like numerals of reference indicate the same parts throughout the several figures in which:

1 indicates the friction transmission gear which comprises a suitable frame 2, said frame being provided at either end with journal boxes 3 and 4 through which journal box 3 the engine shaft 5 extends while the journal box 4 accommodates the sleeve 6. I provide a roller bearing 7 in each of the journal boxes 3 and 4 to reduce the friction upon the shaft 5 and sleeve 6. I provide collars 8 and suitable ball bearings 9 for taking up the thrust of the shaft 5 and sleeve 6 in both directions.

Keyed on the shaft 5 is a male clutch member 10 and loosely carried on the shaft 5 adjacent the clutch member 10 is a driving gear 11, said driving gear having a flange 12 thereon forming a female clutch member as clearly shown in Fig. 3. Keyed on the shaft 5 adjacent the driving gear 11 is a female clutch member 13, and keyed on the sleeve 6 is a male clutch member 14, said male clutch members 10 and 14 being preferably provided around their engaging flanges with a strip 15 of leather, felt or other suitable material.

Carried in suitable journal boxes 16 mounted on the frame 2 are the driven gears 17 and 18, said driven gears being provided with a large central bore 19 (Fig. 4) to accommodate the movable friction plates 20 and 21.

It will be seen from the sectional view (Figs. 3 and 4) that the friction plates 20 and 21 are each provided with a hub 22 which enters the bore 19 in each of the driven gears 17 and 18, and it will be seen from Fig. 4 that a roller bearing 23 is provided for each of the driven gears 17 and 18 to reduce friction; while a disk or plate 24 suitably secured to the hub 25 of each of the driven gears 17 and 18 securely holds said gears against end play causing them to rotate uniformly on the roller bearings 23.

Within the hub 22 on each of the movable friction plates 20 and 21 I provide a pin 26 and under said pin a spring 27 normally holding the pin in position shown in Fig. 4. Upon the outer face of the hub 22 of each of the movable friction plates 20 and 21 I provide a ball bearing 28 which comprises a plate 29 within which the reduced end of the pin 26 enters in order to hold said plate and ball bearing in its proper relative position.

Secured to each of the boxes 16 by means of suitable bolts 30 is a casing 31 which casing carries a threaded bolt 32, said casing being provided with a slot 33 in the top thereof through which the lever 34 extends. Connected to or formed integral with said lever 34 is a disk or member 35, said disk or member being provided with preferably three inclined planes 36. Associated with said disk or member 35 is a similar disk or member 34' which is also provided with preferably three inclined planes or surfaces 36 co-acting with the planes or surfaces 36 on the disk or member 35. The reduced end 37 of the threaded bolt 32 enters each of the members 35 and 34' to center the same and hold these members in their proper relative positions, a pin or lug 38 on the member 34 holding said member against rotation as clearly shown in Fig. 4.

Slidably but not rotatably mounted on the sleeve 6 is a friction wheel 39, said friction wheel being provided with a periphery 40 of felt, leather or other suitable material; while an operating lever 41 and connecting link 42 are arranged as shown in Fig. 3 for sliding the friction wheel 39 along the sleeve 6.

Referring now to Fig. 1 it will be seen that upon the hub of the male clutch member 10 I provide a collar 43 having two extending lugs 44, said lugs entering a suitable lever 45 fulcrumed at 46 as shown in Fig. 1, a similar collar 47 and lugs 48 being carried on the hub of the male clutch member 14, while a lever 49 in engagement with said collar and fulcrumed at 50 is provided as shown in Fig. 1. A link 51 connects the upper end of said levers together while a link 52 connects said link 51 with an arm 53 on the rock shaft 54, said rock shaft 54 extending transversely of the device and being provided at each end with a downwardly extending arm or lever 55 as shown in Fig. 2. An arm or lever 56 carried on the rock shaft 54 connects by means of any suitable link or rod with an operating lever or device (not shown). Connecting each of the arms or levers 55 with the arm or lever 34 operating the movable friction plates is a divided operating rod 57, said rod comprising two sections 58 and 59 which as shown in Fig. 2 have their ends threaded into collars 60, said collars 60 being threaded on their exteriors to receive a suitable spring 61 as clearly shown. Connecting also the lever or arm 34 operating the movable friction plates with the base or frame 2 is a spring 62 which normally holds said arm or lever 34 in position shown in Fig. 1.

Referring now to Fig. 3 and to the sleeve 6 it will be seen that I provide a socket 63 on a universal joint 64 on the end of said sleeve, while at each end of said sleeve 6 within the bore thereof I provide a bushing 65 of suitable anti-friction metal to reduce the friction between the shaft 5 and the sleeve 6 when said shaft is rotating within the sleeve.

Having thus described the several parts of my invention its operation is as follows: In order to effect the direct drive without bringing into action the friction device, the operating arm or lever 56 is forced toward the device which rocks the rock shaft 54 causing the short arm 53 thereon to move the links 51 and 52 and lever 49, which lever 49 acting on the male clutch member 14 forces said clutch member 14 into engagement with the clutch member 13, the clutch member 13 being keyed to the shaft 5 and the clutch member 14 being keyed to the sleeve 6, said shaft 5 and sleeve 6 are securely locked together which causes the sleeve 6 to rotate with the shaft 5 thus effecting a direct drive. When it is desired to throw out the direct drive and throw in the friction drive the arm or lever 56 is moved in the opposite direction which rocks the rock shaft 54, and through the medium of the arm or lever 55 and divided rod 57 moves the arm or lever 34 on the disk or member 35 causing the inclined planes or surfaces 36 thereon to act against the inclined planes or surfaces 36 on the disk or member 34'. This action forces the disk or member 35 against the ball bearings 28 forcing each friction plate 20 and 21 a slight distance out of each of the driven gears 17 and 18 causing said plates to engage the periphery 40 of the friction wheel 39. At the same time that the movable friction plates are being forced into engagement with the friction wheel 39 the lever 45 (Fig. 1) acting on the hub of the male clutch member 10 forces said clutch member into engagement with the clutch member 12 formed on the driving gear 11, thus rotating said driving gear 11 which rotates the driven gears 17 and 18.

Referring to Fig. 3 it will be seen that upon each of the friction plates 20 and 21 I provide a series of lugs or projections 66 which enter corresponding openings 67 in each of the driven gears 17 and 18; and upon each of the lugs or projections 66 I provide a coil spring 68 having a normal tendency to hold the friction plates 20 and 21 out of engagement with the friction wheel 39 and in position shown in Fig. 3. By means of these lugs or projections 66 the rotation of the driven gears 17 and 18 is communicated to the friction plates 20 and 21 causing said plates to rotate with the driven gears.

By means of the operating lever 41 the friction wheel 39 can be moved on the sleeve 6 to either side of the center of the friction plates 20 and 21, the farther the friction wheel 39 is moved from the center of the plates 20 and 21 the faster said wheel rotates, and as the sleeve 6 rotates with the friction wheel 39 said sleeve can be rotated fast or slow according to the position of the friction wheel 39 on the friction plates 20 and 21. By means of this construction the friction wheel 39 and sleeve 6 can be caused to rotate in either direction according to the position of the friction wheel 39 on the friction plates 20 and 21, and by a sliding movement of the lever 41 the speed of the friction wheel 39 and sleeve 6 can be increased or diminished as desired.

Having thus fully described my invention what I claim as new and desire to secure by Letters Patent of the United States is—

1. A transmission gear comprising a drive shaft, a sleeve arranged to receive the same, said sleeve being normally rotatable on said shaft, a clutch member on said shaft, a driving gear actuated by said clutch, driven gears in mesh with and actuated by said driving gear, friction plates carried by said driven gears, a friction wheel mounted on said sleeve which mechanism communicates the movement of said shaft to said sleeve, a clutch member on said sleeve and a clutch member on said shaft, said clutch members being arranged for engagement to lock said sleeve and said shaft in such manner that said shaft may be revoluble uniformly with said shaft, substantially as described.

2. A transmission gear comprising a drive shaft, a sleeve arranged to receive the same, said sleeve being normally rotatable on said drive shaft, means for locking said sleeve and drive shaft together in such manner that said sleeve is rotatable uniformly with said drive shaft, a friction wheel mounted on said sleeve and slidably but non-rotatably carried thereon, intermediate mechanism between said drive shaft and said friction wheel for communicating movement of said shaft to said friction wheel, said intermediate mechanism comprising a clutch mounted on said drive shaft, a driving gear wheel, said driving gear wheel being formed on the female member of said clutch, gears driven by said driving gear, a movable friction plate carried on each of said driven gears, each of said driven gears being provided with a central bore or opening and each of said friction plates being provided with a central boss or hub arranged to enter the said bore or opening in the said driven gear wheels, and means for engagement with each central boss or hub on the said friction plates for moving said friction plates into engagement with said friction wheel and for relieving the said driven gears of the strain or thrust of said friction plates, substantially as described.

3. A transmission gear comprising a driven member, a driving member, means for locking said driving member and driven member in such manner that said driven member will revolve uniformly with said driving member, a friction wheel carried on said driven member, a clutch carried on said driving member, a driving gear, two driven gears, a friction plate carried in each of said driven gears, and mechanism for moving each of said friction plates into engagement with said friction wheel, said mechanism comprising means for taking the thrust of each of said friction plates and relieving the said driven gears from the strain thereof, substantially as described.

In testimony whereof, I affix my signature, in presence of two witnesses.

JOHN CLINTON MACKEY.

Witnesses:
 FRANK W. MOSSETT,
 FRED. A. FRY.

Copies of this patent may be obtained for five cents each, by addressing the "Commissioner of Patents, Washington, D. C."